US012784769B1

(12) United States Patent
Traldi et al.

(10) Patent No.: US 12,784,769 B1
(45) Date of Patent: Nov. 3, 2026

(54) HDD PREAMPLIFIER WRITER AND METHOD OF CALIBRATING THEREOF

(71) Applicant: STMicroelectronics International N.V., Geneva (CH)

(72) Inventors: Matteo Alessio Traldi, Milan (IT); Paolo Pulici, Lainate Mi (IT); Alberto Vangelista, Milan (IT); Davide Morello, Milan (IT)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 19/343,694

(22) Filed: Sep. 29, 2025

(51) Int. Cl.
*G11B 5/02* (2006.01)
*G11B 20/10* (2006.01)
*G11B 20/14* (2006.01)
*G11B 5/00* (2006.01)

(52) U.S. Cl.
CPC ........ *G11B 5/022* (2013.01); *G11B 20/10222* (2013.01); *G11B 20/1403* (2013.01); *G11B 2005/001* (2013.01)

(58) Field of Classification Search
None
See application file for complete search history.

(56) References Cited

U.S. PATENT DOCUMENTS

| | | | | |
|---|---|---|---|---|
| 6,128,146 | A * | 10/2000 | Ngo | G11B 5/012 360/68 |
| 9,111,561 | B1 | 8/2015 | Contreras | |
| 9,153,248 | B1 * | 10/2015 | Contreras | G11B 5/02 |
| 9,978,401 | B1 * | 5/2018 | Rivkin | G11B 20/10009 |
| 10,991,391 | B1 * | 4/2021 | Tang | G11B 20/10027 |
| 11,657,846 | B1 | 5/2023 | Mammei | |
| 2001/0022700 | A1 * | 9/2001 | Lacombe | G11B 5/105 360/68 |
| 2003/0067700 | A1 * | 4/2003 | Barnett | G11B 5/022 |
| 2003/0081339 | A1 | 5/2003 | Barnett | |
| 2005/0007686 | A1 * | 1/2005 | Bloodworth | G11B 5/022 |
| 2006/0119970 | A1 | 6/2006 | Hayashi | |
| 2009/0116134 | A1 * | 5/2009 | Howley | G11B 5/022 360/71 |
| 2013/0128375 | A1 * | 5/2013 | Livshitz | G11B 20/10222 |
| 2013/0308222 | A1 * | 11/2013 | Dina | G11B 5/022 360/55 |
| 2014/0126077 | A1 * | 5/2014 | Contreras | G11B 20/10027 |
| 2014/0226234 | A1 | 8/2014 | Livshitz | |
| 2016/0260454 | A1 * | 9/2016 | Dina | G11B 5/09 |
| 2017/0070149 | A1 | 3/2017 | Guan | |

* cited by examiner

*Primary Examiner* — Peter Vincent Agustin
(74) *Attorney, Agent, or Firm* — Slater Matsil, LLP

(57) ABSTRACT

A preamplifier circuit of a hard disk drive, the preamplifier circuit includes a writer circuit configured to generate a two-level current signal for driving a magnetic head of the hard disk drive. The two-level current signal includes a steady-state current and an overshoot current. The writer circuit includes a driver circuit configured to generate the overshoot current with a programmable duration. The driver circuit includes a delay circuit configured to generate a delay control signal controlling the programmable duration of the overshoot current. The writer circuit further includes a feedback circuit configured to generate an oscillation signal when coupled to the driver circuit. The oscillation signal has a frequency that corresponds to the programmable duration of the overshoot current.

20 Claims, 8 Drawing Sheets

HDD PREAMPLIFIER WRITER AND METHOD OF CALIBRATING THEREOF

TECHNICAL FIELD

The present disclosure relates generally to systems and methods for calibrating an overshoot current of a hard disk drive preamplifier writer.

BACKGROUND

Hard disk drives generally comprise a printed circuit board containing controlling electronics and a head-disk assembly where magnetic disks and heads are located within a sealed environment. The heads couple to a moving actuator that positions them over concentric circular tracks on the magnetic disks. A preamplifier, typically located on the moving actuator, processes signals to and from the disk through flexible circuits that accommodate the actuator movement. Data encoding on magnetic media utilizes magnetic layers that can be magnetized in opposite polarities, with information stored based on the timing and duration of magnetic transitions rather than their polarity. The write process involves transmitting current through coils in the magnetic heads to create magnetic fields that orient magnetic domains on the disk surface. Preamplifiers convert differential voltage signals from system controllers into differential currents that drive the coils in the magnetic heads.

SUMMARY

In accordance with an embodiment, a preamplifier circuit of a hard disk drive, the preamplifier circuit includes: a writer circuit configured to generate a two-level current signal for driving a magnetic head of the hard disk drive, the two-level current signal including a steady-state current and an overshoot current, wherein the writer circuit includes: a driver circuit configured to generate the overshoot current with a programmable duration, the driver circuit including a delay circuit configured to generate a delay control signal controlling the programmable duration of the overshoot current; and a feedback circuit configured to generate an oscillation signal when coupled to the driver circuit, the oscillation signal having a frequency that corresponds to the programmable duration of the overshoot current.

In accordance with an embodiment, a preamplifier circuit of a hard disk drive, the preamplifier circuit includes: a writer circuit configured to generate a two-level current signal for driving a magnetic head of the hard disk drive, the two-level current signal including a steady-state current and an overshoot current, wherein the writer circuit includes: an H-bridge; a first driver circuit coupled to a first transistor of the H-bridge, the first driver circuit being configured to generate the overshoot current with a programmable duration, the first driver circuit including: a first current source configured to provide a first overshoot duration control current; and a first capacitor coupled to receive the first overshoot duration control current; and a first feedback circuit configured to generate a first oscillation signal when coupled to the first driver circuit, the first oscillation signal having a first frequency that corresponds to the programmable duration of the overshoot current.

In accordance with an embodiment, a method for calibrating a writer circuit of a preamplifier circuit of a hard disk drive, the method includes: coupling a driver circuit of the writer circuit to a feedback circuit of the writer circuit; setting a control current range and a step number for a current source of the writer circuit; setting a control current of the current source to a first control current value; measuring a first period of a first oscillating signal; setting the control current of the current source to a second control current value; measuring a second period of a second oscillating signal; determining an overshoot current duration step value based on the first period, the second period, and a number of steps between the first control current value and the second control current value; determining whether the overshoot current duration step value matches a desired overshoot current duration step value within a threshold; and in response to determining that the overshoot current duration step value does not match the desired overshoot current duration step value within the threshold, adjusting the control current range.

BRIEF DESCRIPTION OF THE DRAWINGS

The foregoing features and advantages, as well as others, will be described in detail in the following description of specific embodiments given by way of illustration and not limitation with reference to the accompanying drawings, in which.

Figure 1:
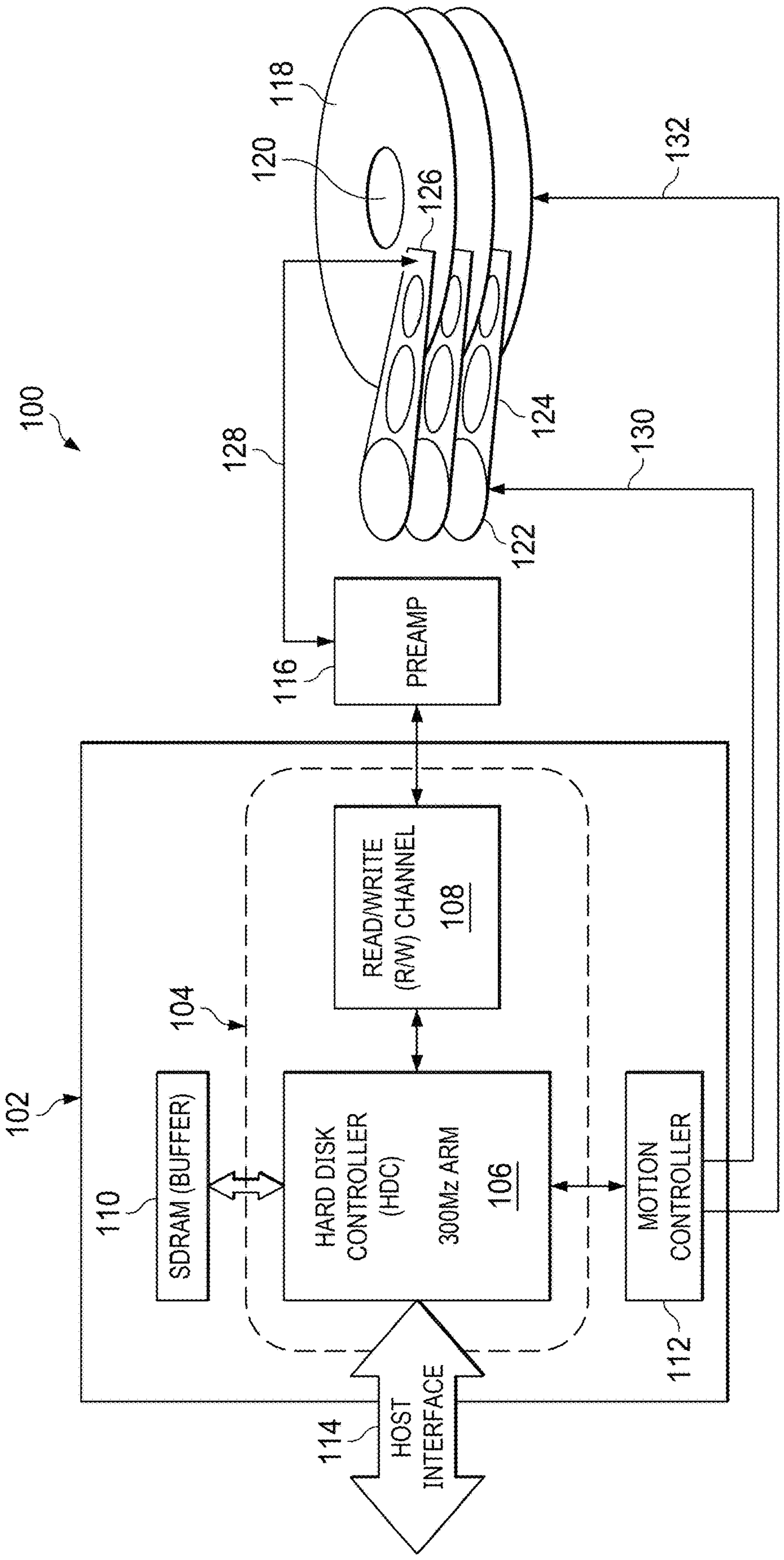
FIG. 1 depicts a schematic view of a hard disk drive, in accordance with some embodiments.

In order to favor the clarity of the features shown, the figures may be drawn in simplified fashion, are not necessarily drawn to scale, and the edges of the figures may not necessarily indicate termination of the extent of the feature.

DETAILED DESCRIPTION OF ILLUSTRATIVE EMBODIMENTS

In the figures and in the rest of the description, like features have been designated by like references in the various figures; as such, a corresponding description may not be repeated for the sake of brevity. In particular, the structural and/or functional features that are common amongst the various embodiments may have the same references and may have identical structural, dimensional, and material properties. Finally, the different embodiments and variants are not exclusive to one another and can be combined amongst themselves.

In the ensuing description, one or more specific details are illustrated, aimed at providing an in-depth understanding of embodiments of this disclosure. The embodiments may be implemented without one or more of the specific details, or with other methods, components, materials, etc. In some cases, known structures, materials, or operations may not be illustrated or described in detail so as to not lose focus on the main aspects of embodiments of the disclosure.

Reference to "an embodiment" or "one embodiment" in the present description should be understood as meaning "at least one embodiment". Moreover, phrases such as "in an embodiment" or "in one embodiment" that may be present in one or more points of the present description do not necessarily refer to one and the same embodiment. Moreover, particular configurations, structures, or characteristics may be combined in any manner known to skilled persons in one or more other embodiments.

Unless indicated otherwise, when reference is made to two elements directly connected together, this signifies direct contact of one element to the other without any intermediate elements. When reference is made to two elements connected or coupled together, this signifies that these two elements can be either directly connected or they can be indirectly connected via one or more other intermediate elements.

Unless specified otherwise, the expressions "about", "around", "approximately", "substantially" and "in the order of" signify within 10% or 10°, and preferably within 5% or 5°. Additionally, the phrase "comprised between . . . and . . . " or equivalent signifies that the end points are included, unless otherwise indicated.

Where not otherwise defined, all technical and scientific terms used herein have the same meaning commonly used by skilled persons in the field pertaining to the present disclosure. The views included in the attached figures and described herein are not intended as representations of structural features, i.e., constructional limitations, but should be interpreted as representations of functional features, i.e., functions that can be implemented in different ways.

While the embodiments of the present disclosure are described primarily in the context of hard disk drive preamplifiers and magnetic storage systems, it should also be appreciated that these embodiments may also apply to other high-speed pulse generation circuits requiring precise timing control. In particular, aspects of this disclosure may similarly apply to radio frequency pulse generators, laser driver circuits, high-speed digital signal processing applications, and any electronic system where programmable pulse durations in the picosecond to nanosecond range require accurate calibration and measurement despite process variations in semiconductor manufacturing.

Embodiments of the present disclosure provide a preamplifier circuit for hard disk drives that incorporates an integrated calibration system for controlling overshoot current duration. The preamplifier circuit comprises a writer circuit configured to generate a two-level current signal for driving magnetic heads, where the current signal includes both steady-state current and overshoot current components. The overshoot current provides enhanced magnetic field strength during write transitions to ensure proper orientation of magnetic domains on the disk surface.

The writer circuit includes driver circuits that generate the overshoot current with programmable duration through current sources and capacitors. Process variations in semiconductor manufacturing can cause deviations in the actual timing characteristics of these components, potentially affecting write performance. To address this challenge, embodiments incorporate feedback circuits that create ring oscillator configurations incorporating capacitors that control overshoot duration.

In some embodiments when the feedback circuits are coupled to drivers, the resulting ring oscillator configurations generate oscillation signals having frequencies that directly correspond to the programmed overshoot durations. These oscillation signals can be frequency-divided to ranges suitable for measurement by standard test/measurement equipment. By measuring oscillation periods at different current settings, the system can determine actual step sizes and calibrate the current sources to achieve desired timing accuracy.

The integrated calibration approach provides several advantages over conventional indirect measurement techniques. The direct measurement eliminates errors from signal asymmetries and output impedance effects that can compromise accuracy in traditional approaches. The feedback circuits enable parallel calibration of multiple channels simultaneously while using the same components that control actual write operations. These and additional details are further discussed below.

A hard disk drive generally includes a single printed circuit board with most of the controlling electronics contained on this one board. Electrical interface to the disk drive is accomplished through connectors on this printed circuit board. All data bits and control signals transferred to and from a host computer are transferred through this printed circuit board.

Hard disk drive magnetic disks and heads are located inside a sealed clean environment typically called a head-disk assembly (HDA). The heads are connected to a moving actuator that typically positions the heads over any one of many concentric circular tracks. The heads connect to an integrated circuit microchip most often called a preamplifier. Signals to and from the disk are processed through the preamplifier. A preamplifier is typically located on the moving actuator. The signals between the printed circuit board and the preamplifier are transmitted through a flexible circuit that can vary in length, but generally is about 7 cm or 8 cm long. This length is needed to allow the moving actuator to rotate to access any of the data tracks on the disk.

Data is encoded on the disk magnetically. The disk surface contains a magnetic layer. The magnetic layer is typically magnetized. The process of recording is accomplished by fully saturating the disk into magnetic regions of opposite polarity (most often up or down) on the disk. The data read and recovery utilizes a very sensitive magnetic transducer that produces a very small electrical signal that is amplified in the preamplifier chip and transmitted to the printed circuit board through the flex circuit. The data information is decoded and transmitted back to the host computer through the printed circuit board.

The information on the disk is encoded by the timing (length or duration) of the magnets on the disk, and not the polarity of the magnets. Ideally, the transition timing is at discrete intervals often described as 1T, 2T, 3T, etc. where Tis the reciprocal of the data rate, or timing interval. Typical data rates in modern disk drives are approaching 4 Gb/s with some projections closer to 5 Gb/s. 1T transitions may be 200 to 250 picoseconds apart resulting in very small magnets. Longer duration 3T, 4T, 5T, etc. write timings result in larger magnets being written to the disk. The data is encoded in the resulting length of the magnets. As will be appreciated, for precision the timing must be controlled to a very small fraction of the window. Typically, less than 10 pS.

The write process is accomplished by transmitting a current through a small coil in the head. Transitions are recorded by reversing the electrical current direction in the head. During the write process, encoded data is transmitted from the printed circuit board to the preamplifier through a differential pair transmission line. The preamplifier converts the differential pair voltage signal into a differential current and drives the current through the write coil in the head. Variations in propagation delay and timing of the signal transitions are carefully controlled.

FIG. 1 depicts a schematic view of a hard disk drive (HDD) 100, in accordance with some embodiments. The HDD 100 comprises various components integrated to enable data storage and retrieval operations on magnetic media. The system architecture illustrates the interconnection between electronic control circuits and mechanical components that facilitate positioning and data transfer operations.

The HDD 100 includes a printed circuit board (PCB) 102 that serves as a platform for mounting electronic components and providing electrical interconnections throughout the system. The PCB 102 supports various integrated circuits and provides signal routing between different functional blocks. A system-on-chip (SoC) 104 is disposed on the PCB 102 and functions as the primary processing unit for managing data operations and system control functions. The SoC 104 integrates multiple processing capabilities and interfaces to coordinate the overall operation of the HDD 100.

In some embodiments, the SoC 104 comprises a hard disk controller (HDC) 106 coupled to a read/write (R/W) channel 108. The SoC 104 manages the flow of data between a host interface 114 and the storage media. The HDC 106 processes commands received from external systems and translates them into appropriate control signals for the mechanical and electronic subsystems of the HDD 100. The R/W channel 108 is operatively coupled to the HDC 106 and handles the encoding and decoding of data signals during write and read operations. The R/W channel 108 processes digital data for storage on the magnetic media and recovers stored data during read operations.

Memory 110 is placed on the PCB 102, is coupled to the HDC 106, and provides temporary storage for data and control information during HDD operations. The memory 110 may buffer data during transfer operations and store operational parameters for the HDC 106. In an embodiment, the memory 110 comprises synchronous dynamic random-access memory (SDRAM). In other embodiments, the memory 110 may comprise any suitable memory type.

A host interface 114 provides communication connectivity between the HDD 100 and external computer systems or host devices. The host interface 114 handles protocol conversion and data transfer operations between the internal electronics of the HDD 100 and external systems. In various embodiments, the host interface 114 may support different communication standards and protocols for compatibility with various host systems. A motion controller 112 is placed on the PCB 102, receives control signals from the HDC 106, and generates positioning commands for controlling mechanical components of the HDD 100.

The HDD 100 includes a preamplifier 116 that conditions signals between the R/W channel 108 and R/W heads 126. The preamplifier 116 amplifies weak signals received from the R/W heads 126 during read operations and provides drive current for write operations. The preamplifier 116 is positioned close to the R/W heads 126 heads to minimize signal degradation and noise interference. The R/W heads 126 may be also referred to as magnetic heads.

One or more magnetic disks 118 provide the storage medium for data retention within the HDD 100. In some embodiments, a magnetic disk 118 comprises a substrate with magnetic coating that can be magnetized in different orientations to represent digital data. The magnetic disk 118 rotates at high speed to enable access to different data locations across its surface.

A spindle motor 120 is mechanically coupled to the one or more magnetic disks 118 and provides rotational motion at controlled speeds. The spindle motor 120 maintains constant rotational velocity to ensure consistent data access timing and positioning accuracy. A voice coil motor (VCM) actuator 122 provides radial positioning of R/W heads 126 across the surface of the one or more magnetic disk 118. The VCM actuator 122 responds to control signals from the motion controller 112 to position the R/W heads 126 at specific track locations.

One or more arms 124 are mechanically coupled to the VCM actuator 122 and extend toward the one or more magnetic disk 118 to support respective R/W heads 126. The one or more arms 124 provide a stable mechanical platform for head positioning while allowing rapid movement between track locations. The R/W heads 126 are mounted on respective arms 124 and positioned in close proximity to surfaces of respective magnetic disks 118. The R/W heads 126 comprise transducers (e.g., coils) for both reading magnetic fields from the disk surface and generating magnetic fields for writing data.

In various embodiments, the preamplifier 116 generates a current signal 128 that flows through coils in the R/W head 126 during write operations. The current signal 128 creates magnetic fields that magnetize regions on the magnetic disks 118 to encode digital data. The motion controller 112 generates a VCM control signal 130 that drives the VCM actuator 122 for precise head positioning. A spindle control signal 132 from the motion controller 112 regulates the rotational speed of the spindle motor 120 to maintain consistent rotation of the one or more magnetic disks 118.

Figure 2:
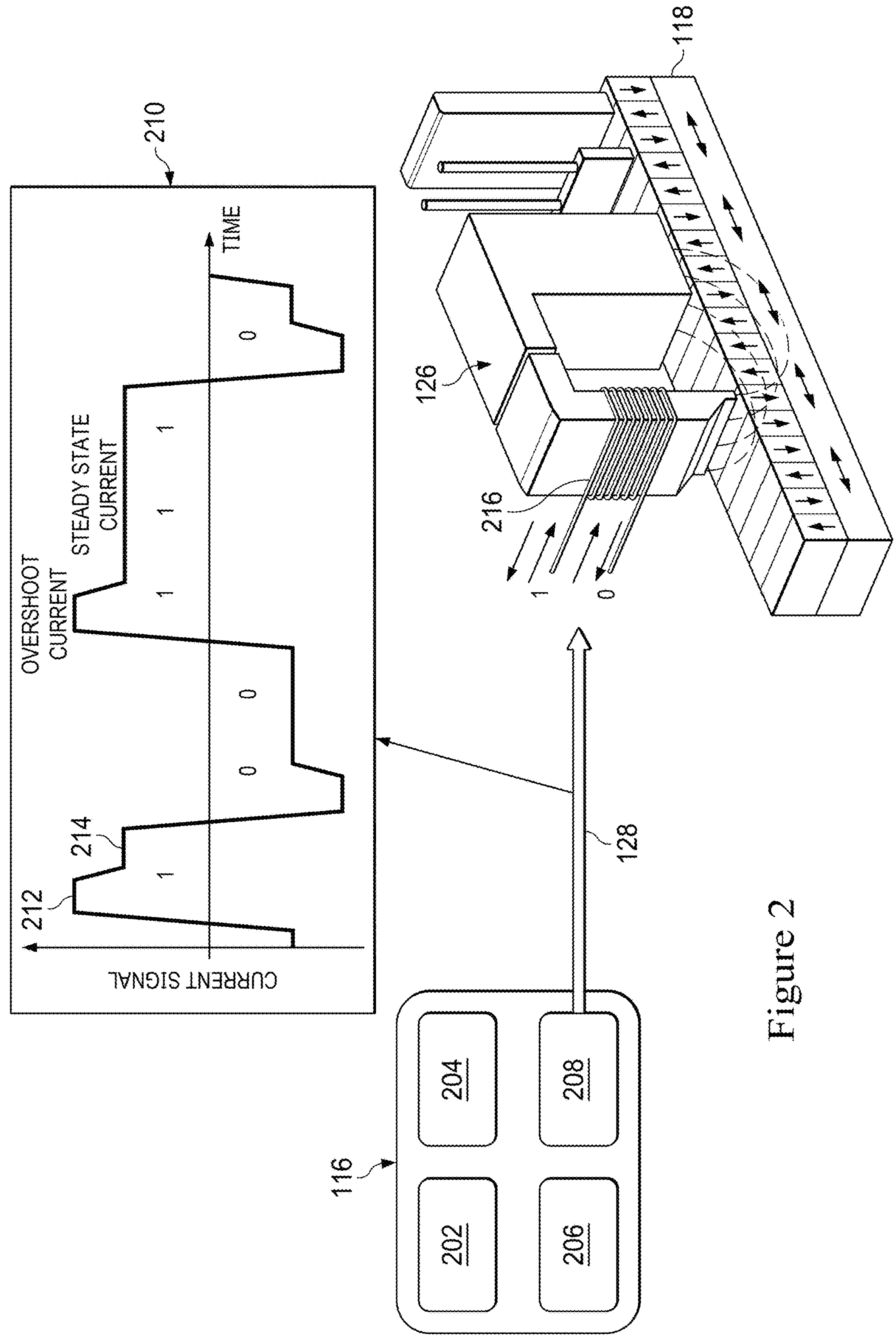
FIG. 2 depicts a schematic view of a preamplifier coupled to a magnetic head, in accordance with some embodiments.

FIG. 2 depicts a schematic view of the preamplifier 116 coupled to the R/W head 126, in accordance with some embodiments. The preamplifier 116 integrates multiple circuit functions to support both read and write operations of the HDD 100 (see FIG. 1). The preamplifier 116 comprises a heater 202 that provides thermal control for the magnetic head assembly. The heater 202 controls the distance between the R/W head 126 and a surface of the magnetic disk 118 by causing thermal expansion that brings the R/W head 126 to a surface of the magnetic disk 118. In various embodiments, the heater 202 enables fly height control to optimize the magnetic coupling between the R/W head 126 and the magnetic disk surface while preventing contact that could cause damage.

The preamplifier 116 further comprises a sensor 204 that monitors various operational parameters of the R/W head 126 and storage environment. The sensor 204 may detect temperature, pressure, or proximity conditions that affect the performance of the storage system. The sensor 204 provides feedback signals that enable adaptive control of operational parameters to maintain optimal performance across varying environmental conditions.

The preamplifier 116 further comprises a reader 206 that amplifies weak magnetic signals detected by the R/W head 126 during read operations. The reader 206 processes the small electrical signals generated when coils 216 of the R/W head 126 sense magnetized regions on the magnetic disk surface. In various embodiments, the reader 206 includes amplification circuits and signal conditioning elements that prepare the detected signals for further processing by downstream electronics.

The preamplifier 116 further comprises a writer 208 that generates drive currents for the R/W head 126 during write operations. The writer 208 converts digital data signals into current pulses that create magnetic fields through the coils 216 in the R/W head 126. The writer 208 controls both the magnitude and timing of current pulses to ensure controlled magnetization of storage regions on the magnetic disk surface. The writer 208 generates a current signal 128 that comprises multiple current levels that correspond to different phases of the write operation. In various embodiments, the current signal 128 includes both steady-state and overshoot current components that optimize the magnetization process.

A graph 210 illustrates a dependence of the current signal 128 on time, in accordance with some embodiments. The current signal 128 includes an overshoot current 212 that provides enhanced current amplitude during the initial portion of write transitions. The overshoot current 212 helps overcome the magnetic coercivity of the storage medium and accelerates the magnetization process. In various embodiments, the overshoot current 212 has a programmable duration that can be adjusted to match the characteristics of different storage media and optimize write performance.

A steady-state current 214 follows the overshoot current 212 and maintains the magnetic field at a level sufficient to complete the magnetization process. The steady-state current 214 provides sustained magnetic field strength while consuming less power than the overshoot current 212. The combination of overshoot current 212 and steady-state current 214 creates a two-level current profile that optimizes both write speed and power consumption.

During the write operation, the R/W head 126 is positioned in proximity to the magnetic disk 118 and responds to the current signal 128 by generating corresponding magnetic fields. The R/W head 126 comprises coils 216 that convert current signal 128 into magnetic flux that penetrates the storage medium. In various embodiments, the R/W head 126 includes separate elements for read and write operations, with the write element receiving the current signal 128 from the writer 208.

Figure 3:
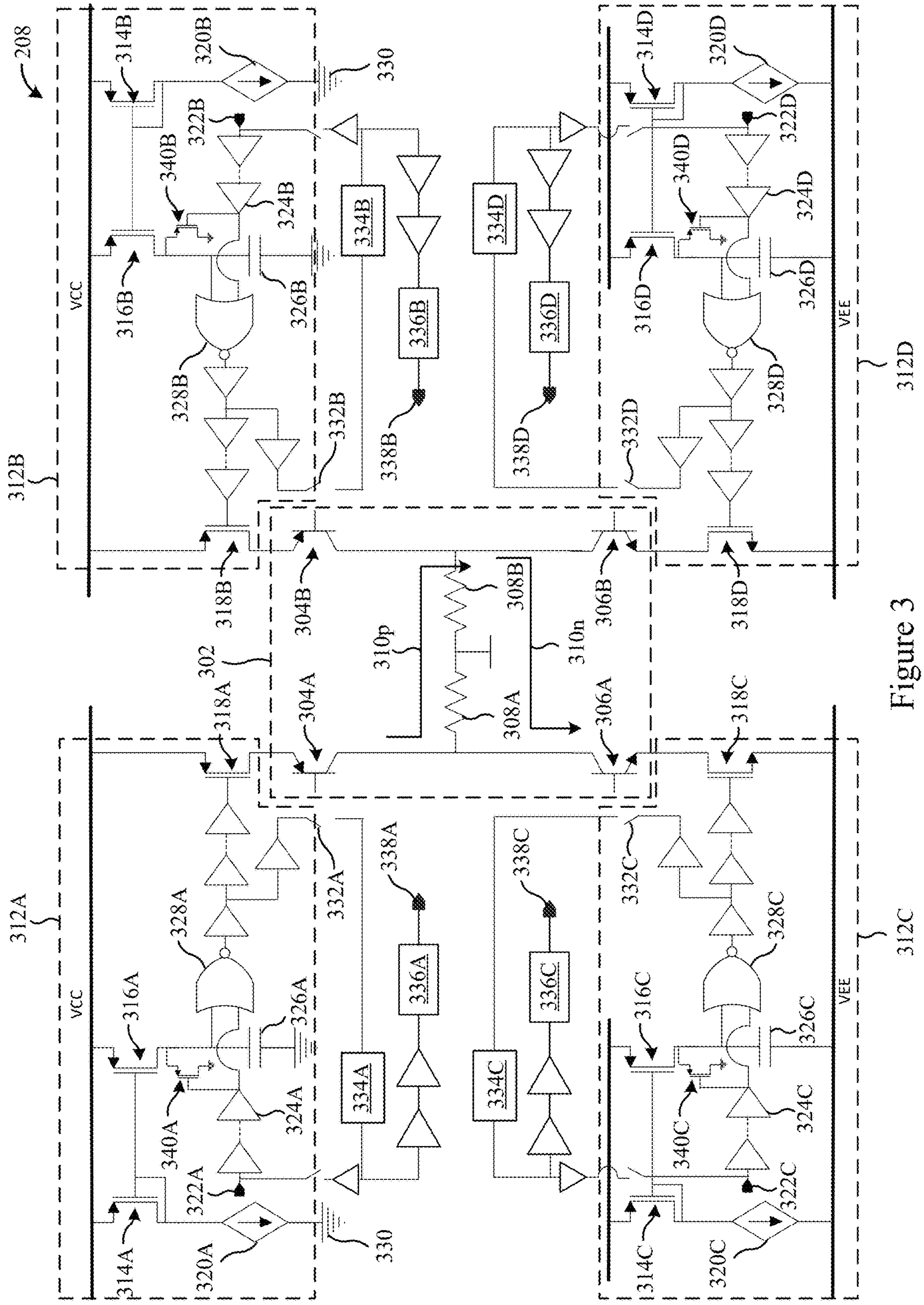
FIG. 3 depicts a schematic view of a preamplifier writer, in accordance with some embodiments.

FIG. 3 depicts a simplified schematic view of a preamplifier writer 208, in accordance with some embodiments. In some embodiments, the writer 208 comprises an H-bridge 302 that provides bidirectional current drive capability for the R/W head 126 (see FIGS. 1 and 2). The H-bridge 302 includes four transistors arranged in a bridge configuration to enable current flow through current paths 310*p* and 310*n*, allowing magnetic field polarity reversal during write operations.

In some embodiments, the H-bridge 302 can comprise PNP transistors 304A and 304B positioned in the upper portion of the bridge configuration, and NPN transistors 306A and 306B positioned in the lower portion of the bridge configuration. Resistors 308A and 308B couple between the output nodes of the H-bridge 302 and provide termination impedance for the transmission line connecting to the R/W head 126 (see FIGS. 1 and 2). The current signal 128 (see FIGS. 1 and 2) flows between the output nodes of the H-bridge 302 (e.g., through current paths 310*p* or 310*n*) and through the coils 216 (see FIG. 2) of the R/W head 126 (see FIGS. 1 and 2) to generate the desired magnetic fields for data writing.

In some embodiments, the writer 208 further comprises driver circuits 312A, 312B, 312C, and 312D that couple to respective transistors of the H-bridge 302 to provide controlled activation of each bridge element. In the illustrated embodiment, the driver circuit 312A couples to the PNP transistor 304A, the driver circuit 312B couples to the PNP transistor 304B, the driver circuit 312C couples to the NPN transistor 306A, and driver circuit 312D couples to the NPN transistor 306B. Each driver circuit generates the overshoot current with programmable duration for its respective H-bridge transistor.

In some embodiment, the driver circuit 312A comprises a transistor 318A that couples to the H-bridge 302. The driver circuit 312A comprises a current source 320A coupled between a supply voltage VCC and ground 330. The current source 320A is coupled to a first terminal of a capacitor 326A through transistors 314A and 316A and provides an overshoot duration control current to the capacitor 326A that determines overshoot duration timing. A second terminal of the capacitor 326A is coupled to ground 330. In some embodiments, the overshoot duration timing it determined by a charging speed of the capacitor 326A and is inversely proportional to the overshoot duration control current.

A combination of the current source 320A and the capacitor 326A may be also referred to as a delay circuit that controls overshoot duration timing through generating delay control signal values (e.g., an overshoot duration control current values). In various embodiments, the delay circuit may comprise series of inverters and/or buffers, RC circuits, capacitive elements, a combination thereof, or the like.

The driver circuit 312A further comprises a node 322A that is configured to receive a data signal. The node 322A is coupled to the transistor 318A through a plurality of inverters 324A and a logic gate 328A. In an embodiment, the logic gate 328A is configured as an NOR gate. In the illustrated embodiment, the logic gate 328A is coupled between a first subset of the inverters 324A and a second subset of the inverters 324A. The inverters 324A and the logic gate 328A transform the data signal received at the node 322A and provide a transformed data signal to a gate terminal of the transistor 318A. In some embodiments, the plurality of inverters 324A are coupled to the first terminal of the capacitor 326A through transistor 340A. The transistor 340A is controlled by a signal received at the node 322A through the inverters 324A to discharge the capacitor 326A.

In some embodiments, the writer 208 further comprises a feedback circuit 334A. The feedback circuit 334A is configured to be coupled or decoupled from the driver circuit 312A using one or more switches 332A. In some embodiments when the feedback circuit 334A is coupled to the driver circuit 312A, the coupled system incorporates the capacitor 326A into a ring oscillator configuration that oscillates at a frequency corresponding to the programmable duration of the overshoot current.

A frequency divider circuit 336A is coupled to the feedback circuit 334A and converts the oscillation signal generated by the ring oscillator formed by the feedback circuit 334A coupled to the driver circuit 312A to a divided frequency signal that is provided to a node 338A. In some embodiments, the frequency divider circuit 336A is coupled to the feedback circuit 334A through a third subset of the inverters 324A. In some embodiments, the node 338A is configured to be coupled to test/measurement instruments that are capable to measure a frequency of the divided frequency signal.

Driver circuits 312B, 312C, and 312D comprise similar circuit topologies as the driver circuit 312A with components <xyz>B, <xyz>C, and <xyz>D of the driver circuits 312B, 312C, and 312D being similar to respective components <xyz>A of the driver circuit 312A. Driver circuit 312B includes transistors 314B, 316B, and 318B, a current source 320B, nodes 322B and 338B, inverters 324B, a capacitor 326B, a logic gate 328B, switches 332B, a feedback circuit 334B, and a frequency divider circuit 336B. Driver circuit 312C includes transistors 314C, 316C, and 318C, a current source 320C, nodes 322C and 338C, inverters 324C, a capacitor 326C, a logic gate 328C, switches 332C, a feedback circuit 334C, and a frequency divider circuit 336C.

Driver circuit 312D includes transistors 314D, 316D, and 318D, a current source 320D, nodes 322D and 338D, inverters 324D, a capacitor 326D, a logic gate 328D, switches 332D, a feedback circuit 334D, and a frequency divider circuit 336D.

In some embodiments, components (e.g., transistors, capacitors, inverters, and logic gates) of the writer 208 may be formed using complementary metal-oxide-semiconductor (CMOS) process. Process variations in semiconductor manufacturing can cause deviations in the actual timing characteristics of the components of the driver circuits 312A-312D, potentially affecting write performance. To address this challenge, embodiments incorporate the feedback circuits 334A-334D that create ring oscillator configurations incorporating the capacitors 326A-326D that control overshoot duration.

Figure 4:
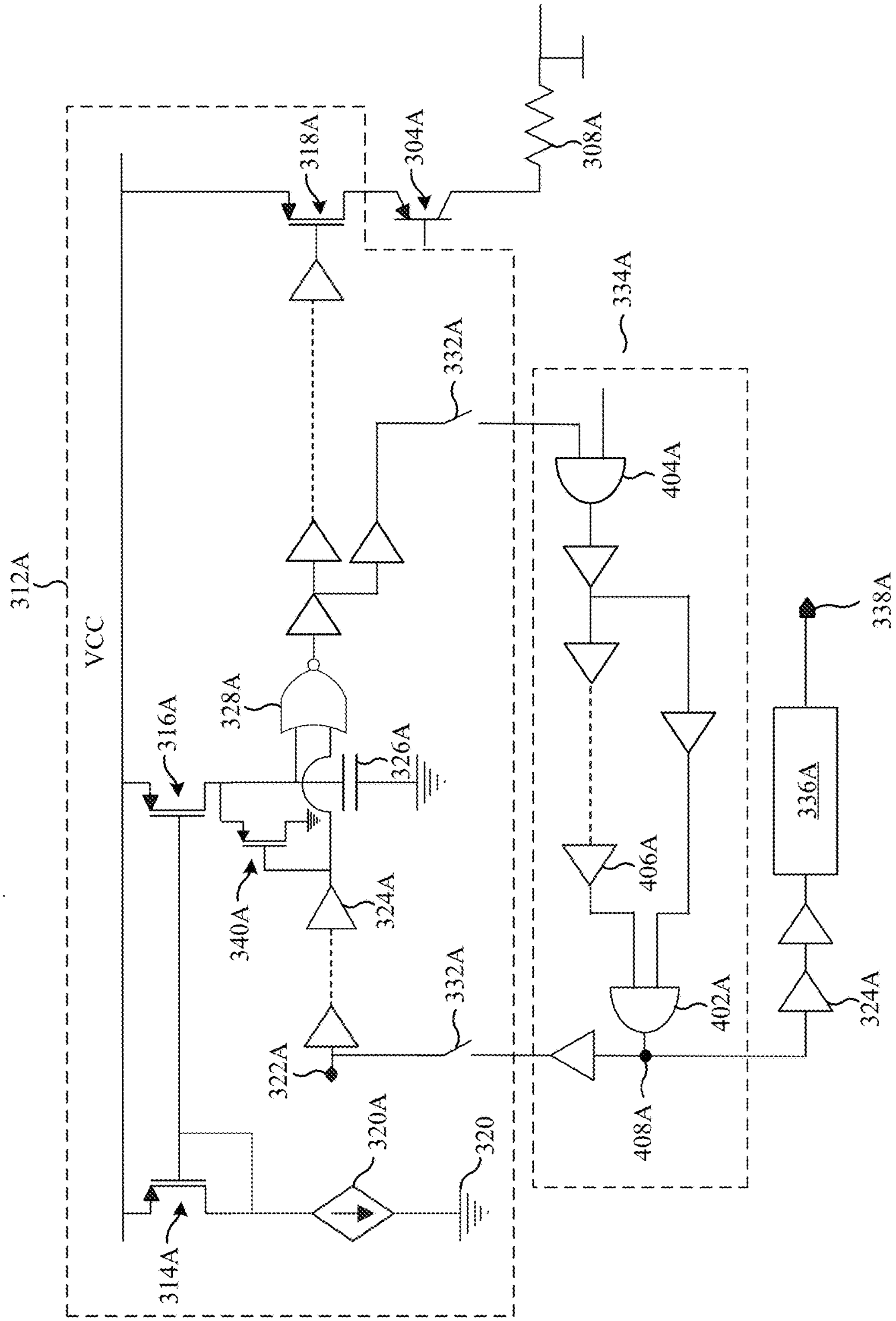
FIG. 4 depicts a schematic view of a portion of a preamplifier writer, in accordance with some embodiments.

FIG. 4 depicts a schematic view of a portion of the preamplifier writer 208, in accordance with some embodiments. In particular, FIG. 4 shows components of the feedback circuit 334A, in accordance with some embodiments. In some embodiments, the feedback circuit 334A comprises a logic gate 402A, a logic gate 404A, and a plurality of inverters 406A coupled between the logic gate 402A and the logic gate 404A. In an embodiment, the logic gates 402A and 404A are configured as AND gates.

The switches 332A enable selective coupling of circuit elements during normal write operations versus calibration modes. When the switches 332A are in the calibration mode, they couple the driver circuit 312A to the feedback circuit 334A and incorporate the capacitor 326A into a ring oscillation configuration. The inverters 406A provide signal inversion and propagation delay within the ring oscillation. A frequency of the oscillation signal generated by the ring oscillator depends directly on the charging characteristics of the capacitor 326A, which in turn depends on a capacitance of the capacitor 326A and the overshoot duration control current received from the current source 320A.

A node 408A provides a connection point within the feedback circuit 334A where the oscillation signal can be accessed for frequency measurement. The oscillation signal at the node 408A has a frequency that corresponds to the overshoot duration timing, enabling direct measurement of the timing characteristics. A frequency divider circuit 336A may be present in the circuit to reduce the frequency of the ring oscillator. The frequency divider circuit 336A couples to the feedback circuit 334A and receives the oscillation signal for frequency division.

The frequency divider circuit 336A reduces the oscillation frequency by a predetermined division factor to generate a divided frequency signal that falls within the measurement range of standard test/measurement equipment. The node 338A provides an output connection for the divided frequency signal, enabling external test/measurement instruments to determine the oscillation period and calculate the corresponding overshoot duration timing.

Figure 5A:
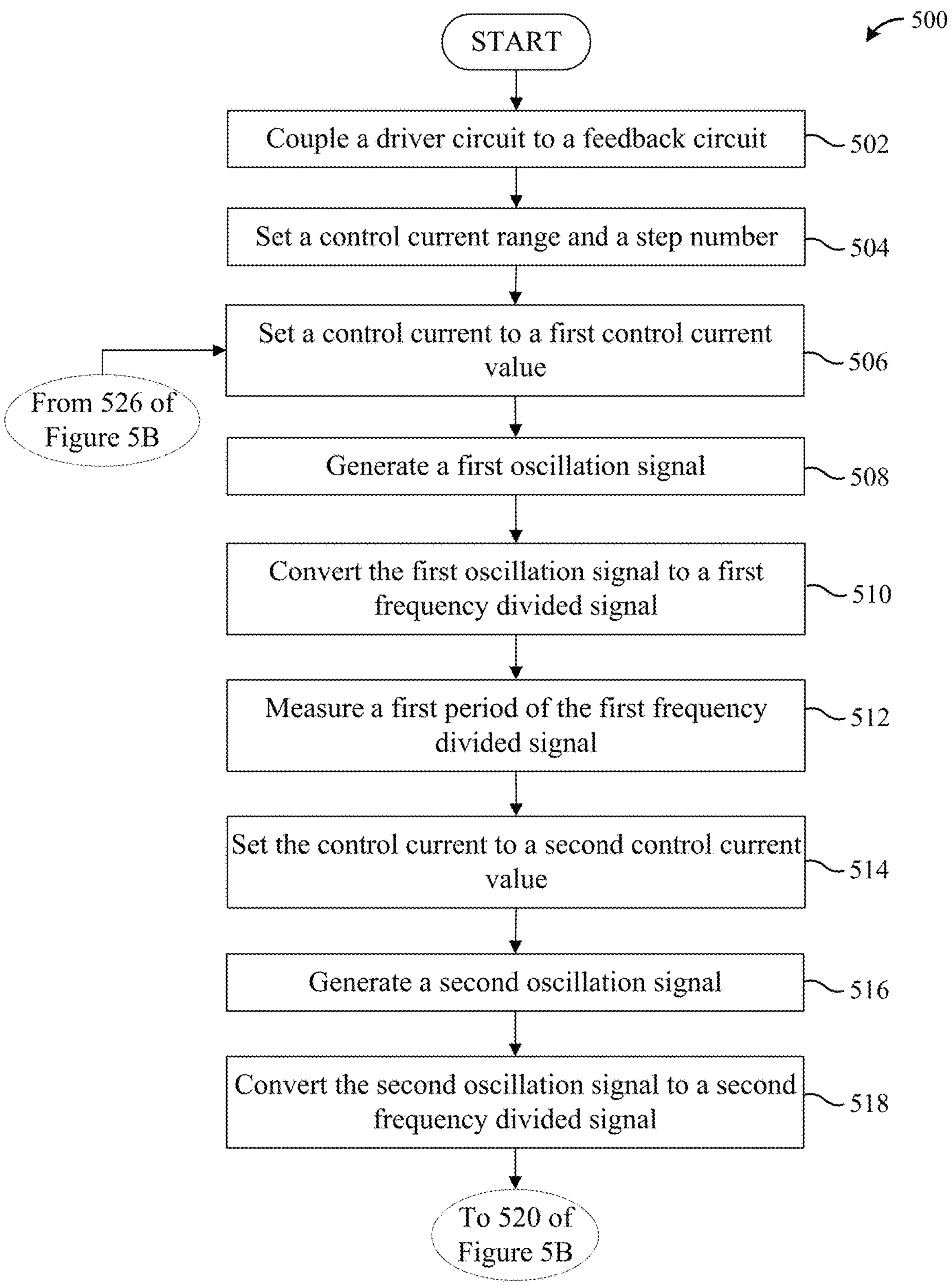
FIGS. 5A and 5B depict a flow diagram of a method for calibrating an overshoot current of a hard disk drive preamplifier writer, in accordance with some embodiments.
Figure 5B:
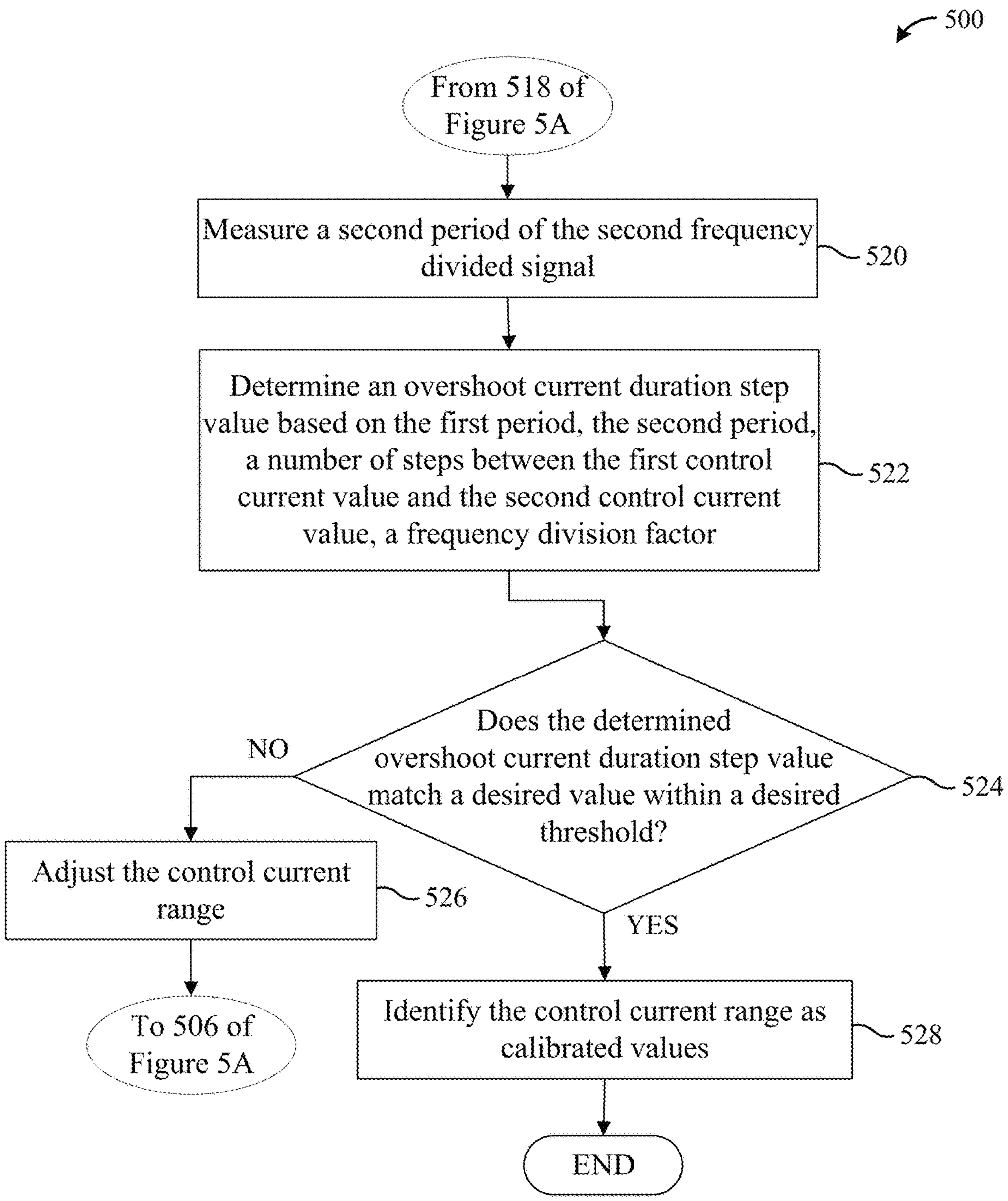

FIGS. 5A and 5B depict a flow diagram of a method 500 for calibrating an overshoot current of a hard disk drive preamplifier writer, in accordance with some embodiments. Although shown in a particular sequence, it should be appreciated that the steps of the method 500 may be performed in any suitable sequence. Furthermore, one or more steps of the method 500 may be omitted.

The method 500 begins with step 502 where a driver circuit (e.g., driver circuit 312A of FIG. 4) of a preamplifier writer (e.g., writer 208 of FIG. 3) is coupled to a feedback circuit (e.g., feedback circuit 334A of FIG. 4). In some embodiments, the driver circuit of the preamplifier writer is coupled to the feedback circuit using one or more switches (e.g., switches 332A of FIG. 4).

In step 504, a control current range and a step number is set for a current source (e.g., current source 320A of FIG. 4). The control current range defines the minimum and maximum current values that will be used during the calibration process, while the step number determines how many discrete steps are available between the minimum and maximum settings. These parameters establish the measurement resolution and range for the calibration procedure.

In step 506, the control current of the current source is set to a first control current value from the control current range. In step 508, a first oscillation signal is generated in a ring oscillator formed by coupling the driver circuit to the feedback circuit. In step 510, the first oscillation signal is converted to a first frequency divided signal. In some embodiments, the first oscillation signal is converted by a frequency divider circuit (e.g., frequency divider circuit 336A of FIG. 4) coupled to the feedback circuit. In step 512, a first period of the first frequency divided signal is measured. In some embodiments, the first period of the first frequency divided signal is measured by a standard test/measurement instrument that is coupled to the frequency division circuit.

In step 514, the control current of the current source is set to a second control current value from the control current range, with the second control current value being different from the first control current value. In step 516, a second oscillation signal is generated in the ring oscillator formed by coupling the driver circuit to the feedback circuit. In step 518, the second oscillation signal is converted to a second frequency divided signal. In some embodiments, the second oscillation signal is converted by the frequency divider circuit (e.g., frequency divider circuit 336A of FIG. 4) coupled to the feedback circuit. In step 520, a second period of the second frequency divided signal is measured. In some embodiments, the second period of the second frequency divided signal is measured by a standard test/measurement instrument that is coupled to the frequency division circuit.

In step 522, an overshoot current duration step value is determined based on the first period, the second period, the number of steps between the first control current value and the second control current value, and a frequency division factor of the frequency division circuit. In an embodiment, the overshoot current step value is determined by formula $$\frac{T_1 - T_2}{N * F},$$

where $T_1$ is the first period, $T_2$ is the second period, N is the number of steps between the first control current value and the second control current value, and F is the frequency division factor.

In step 524, the method 500 determines whether the determined overshoot current duration step value matches a desired overshoot current duration step value within a desired threshold. In response to determining at step 524 that the determined overshoot current duration step value does not match the desired overshoot current duration step value within the desired threshold, the method 500 proceeds to step 526.

In step 526, the control current range is adjusted to bring the actual performance closer to the desired specification. After performing step 526, the method 500 proceeds back to step 506. In some embodiments, steps 506-526 may be performed one or more times until the determined overshoot current duration step value matches the desired overshoot current duration step value within the desired threshold.

In response to determining at step 524 that the determined overshoot current duration step value matches the desired overshoot current duration step value within the desired threshold, the method 500 proceeds to step 528. In step 528, current values of the control current range are identified as calibrated values. These calibrated values can then be stored and used during normal write operations to ensure accurate overshoot duration timing. After performing step 528, the method 500 ends.

Figure 6A:
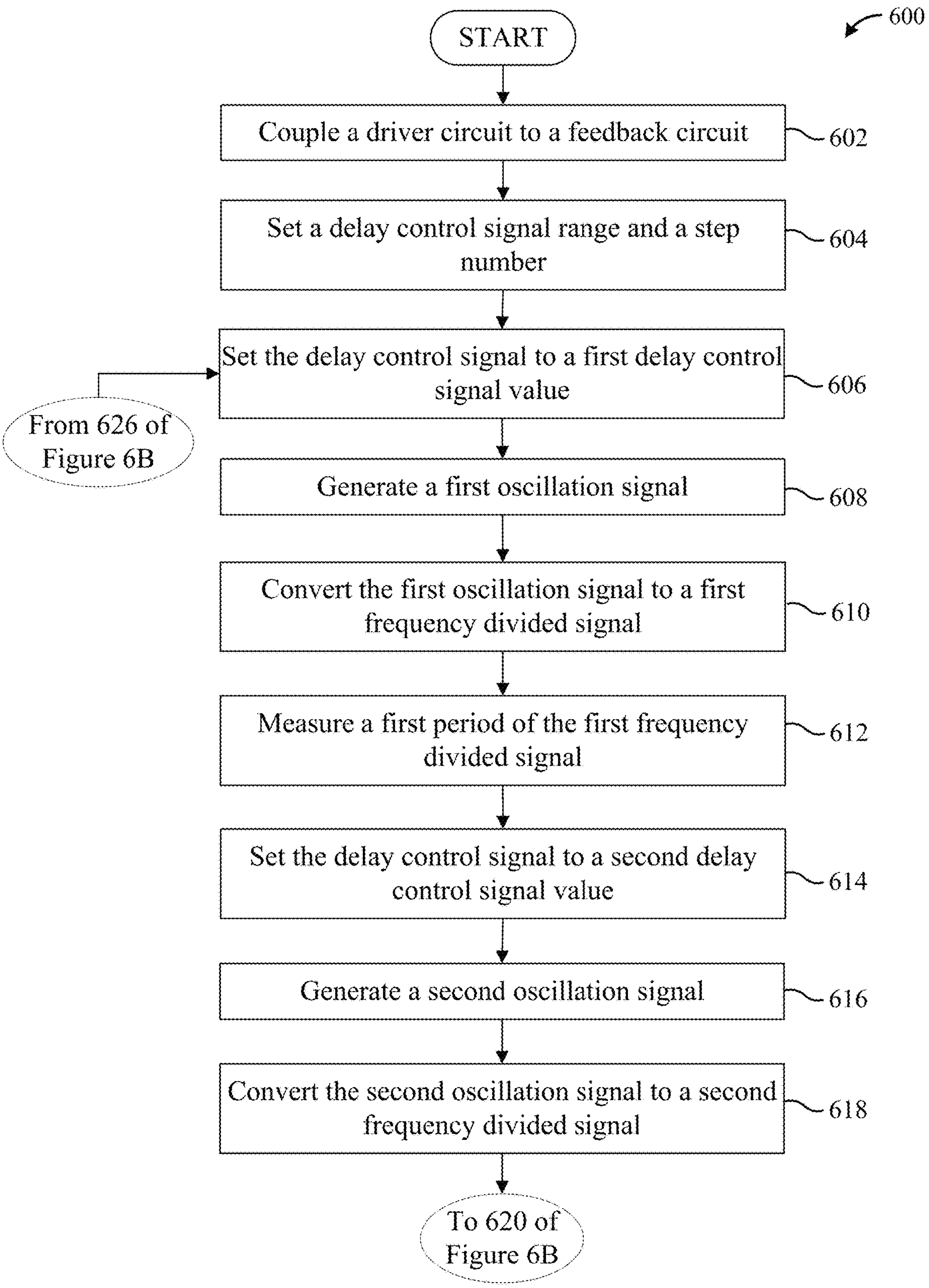
FIGS. 6A and 6B depict a flow diagram of a method for calibrating an overshoot current of a hard disk drive preamplifier writer, in accordance with some embodiments.
Figure 6B:
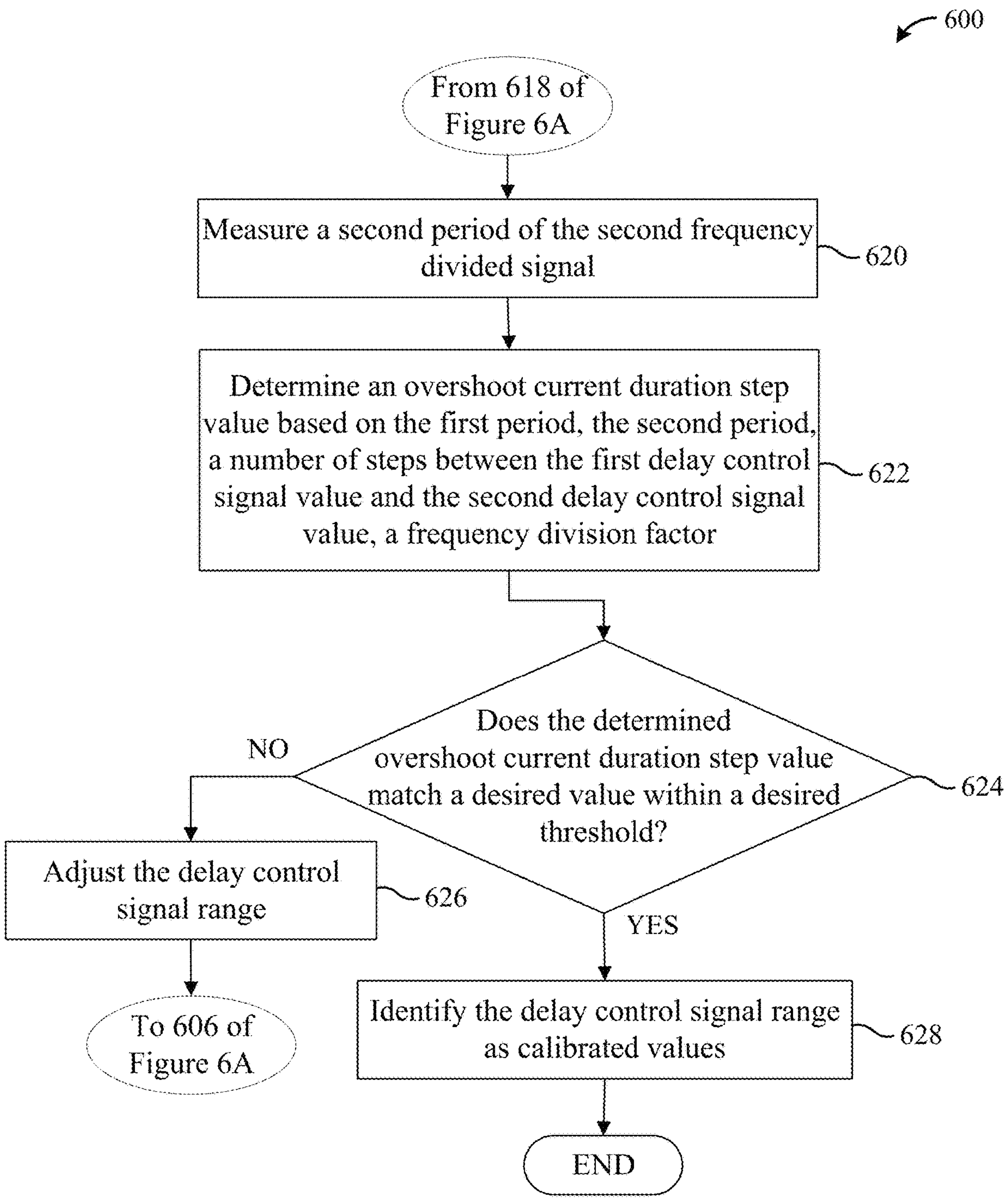

FIGS. 6A and 6B depict a flow diagram of a method 600 for calibrating an overshoot current of a hard disk drive preamplifier writer, in accordance with some embodiments. Although shown in a particular sequence, it should be appreciated that the steps of the method 600 may be performed in any suitable sequence. Furthermore, one or more steps of the method 600 may be omitted.

The method 600 begins with step 602 where a driver circuit (e.g., driver circuit 312A of FIG. 4) of a preamplifier writer (e.g., writer 208 of FIG. 3) is coupled to a feedback circuit (e.g., feedback circuit 334A of FIG. 4). In some embodiments, the driver circuit of the preamplifier writer is coupled to the feedback circuit using one or more switches (e.g., switches 332A of FIG. 4). The driver circuit may comprise a delay circuit configured to control a duration of the overshoot current. In an embodiment, the delay circuit comprises a current source (e.g., current source 320A of FIG. 4) coupled to a capacitor (e.g., capacitor 326A of FIG. 4).

In step 604, a delay control signal range and a step number is set for the delay circuit. The delay control signal range defines the minimum and maximum delay control signal range values that will be used during the calibration process, while the step number determines how many discrete steps are available between the minimum and maximum settings. These parameters establish the measurement resolution and range for the calibration procedure. In an embodiment when the delay circuit comprises the current source coupled to the capacitor, the delay control signal comprises an overshoot duration control current generated by the current source.

In step 606, the delay control signal is set to a first delay control signal value from the delay control signal range. In step 608, a first oscillation signal is generated in a ring oscillator formed by coupling the driver circuit to the feedback circuit. In step 610, the first oscillation signal is converted to a first frequency divided signal. In some embodiments, the first oscillation signal is converted by a frequency divider circuit (e.g., frequency divider circuit 336A of FIG. 4) coupled to the feedback circuit. In step 612, a first period of the first frequency divided signal is measured. In some embodiments, the first period of the first frequency divided signal is measured by a standard test/measurement instrument that is coupled to the frequency division circuit.

In step 614, the delay control signal is set to a second delay control signal value from the delay control signal range, with the second delay control signal value being different from the first delay control signal value. In step 616, a second oscillation signal is generated in the ring oscillator formed by coupling the driver circuit to the feedback circuit. In step 618, the second oscillation signal is converted to a second frequency divided signal. In some embodiments, the second oscillation signal is converted by the frequency divider circuit (e.g., frequency divider circuit 336A of FIG. 4) coupled to the feedback circuit. In step 620, a second period of the second frequency divided signal is measured. In some embodiments, the second period of the second frequency divided signal is measured by a standard test/measurement instrument that is coupled to the frequency division circuit.

In step 622, an overshoot current duration step value is determined based on the first period, the second period, the number of steps between the first delay control signal value and the second delay control signal value, and a frequency division factor of the frequency division circuit. In an embodiment, the overshoot current step value is determined by formula $$\frac{T_1 - T_2}{N * F},$$

where $T_1$ is the first period, $T_2$ is the second period, N is the number of steps between the first delay control signal value and the second delay control signal value, and F is the frequency division factor.

In step 624, the method 600 determines whether the determined overshoot current duration step value matches a desired overshoot current duration step value within a desired threshold. In response to determining at step 624 that the determined overshoot current duration step value does not match the desired overshoot current duration step value within the desired threshold, the method 600 proceeds to step 626.

In step 626, the delay control signal range is adjusted to bring the actual performance closer to the desired specification. After performing step 626, the method 600 proceeds back to step 606. In some embodiments, steps 606-626 may be performed one or more times until the determined overshoot current duration step value matches the desired overshoot current duration step value within the desired threshold.

In response to determining at step 624 that the determined overshoot current duration step value matches the desired overshoot current duration step value within the desired threshold, the method 600 proceeds to step 628. In step 628, current values of the delay control signal range are identified as calibrated values. These calibrated values can then be stored and used during normal write operations to ensure accurate overshoot duration timing. After performing step 628, the method 600 ends.

In various embodiments, the methods 500 and 600 may be applied to each driver circuit and feedback circuit combination in parallel. As shown in FIG. 3, driver circuits 312A, 312B, 312C, and 312D each comprise their respective feedback circuits 334A, 334B, 334C, and 334D, along with corresponding frequency divider circuits 336A, 336B, 336C, and 336D. The methods 500 and 600 can simultaneously calibrate all four branches by performing the measurement and adjustment steps for each driver circuit independently, thereby reducing overall calibration time while ensuring that each H-bridge transistor receives properly calibrated overshoot timing.

In some embodiments, the methods 500 and 600 may be also applied to measure and calibrate other preamplifier parameters such as, for example, write current rise time, propagation delay of internal logics to compensate the process variability, cut-off frequency of analog filters, and analog timers.

Various embodiments and variants have been described. Those skilled in the art will understand that certain features of these embodiments can be combined.

While this disclosure has been described with reference to illustrative embodiments, this description is not intended to be construed in a limiting manner. Various modifications and combinations of the illustrative embodiments, as well as other embodiments of the disclosure, will be apparent to skilled persons in the field of the disclosure upon reference to the description and the figures. It is therefore intended that the appended claims encompass any such modifications or embodiments.

Finally, the practical implementation of the embodiments and variants described herein is within the capabilities of those skilled in the art based on the functional description provided hereinabove while falling within the scope of the disclosure as defined in the attached claims.

What is claimed is:

1. A preamplifier circuit of a hard disk drive, the preamplifier circuit comprising:

a writer circuit configured to generate a two-level current signal for driving a magnetic head of the hard disk drive, the two-level current signal comprising a steady-state current and an overshoot current, wherein the writer circuit comprises:

a driver circuit configured to generate the overshoot current with a programmable duration, the driver circuit comprising a delay circuit configured to generate a delay control signal controlling the programmable duration of the overshoot current;

an H-bridge coupled to the driver circuit; and a feedback circuit configured to generate an oscillation signal when coupled to the driver circuit, the oscillation signal having a frequency that corresponds to the programmable duration of the overshoot current.

2. The preamplifier circuit of claim 1, wherein:

the delay circuit comprises a current source coupled to a capacitor; and the delay control signal comprises an overshoot duration control current generated by the current source.

3. The preamplifier circuit of claim 2, further comprising:

a frequency divider circuit coupled to the feedback circuit, wherein the frequency divider circuit is configured to divide the frequency of the oscillation signal to generate a divided frequency signal, and wherein the overshoot duration control current is adjustable to calibrate the programmable duration of the overshoot current based on a measurement of the divided frequency signal.

4. The preamplifier circuit of claim 3, wherein an output of the frequency divider circuit is configured to be coupled to a frequency measurement circuit.

5. The preamplifier circuit of claim 1, wherein the feedback circuit comprises a feedback path that incorporates the delay circuit into a ring oscillator configuration.

6. The preamplifier circuit of claim 1, wherein the feedback circuit comprises:

a first logic gate;

a second logic gate; and a plurality of inverters coupled between the first logic gate and the second logic gate.

7. A preamplifier circuit of a hard disk drive, the preamplifier circuit comprising:

a writer circuit configured to generate a two-level current signal for driving a magnetic head of the hard disk drive, the two-level current signal comprising a steady-state current and an overshoot current, wherein the writer circuit comprises:

an H-bridge;

a first driver circuit coupled to a first transistor of the H-bridge, the first driver circuit being configured to generate the overshoot current with a programmable duration, the first driver circuit comprising:

a first current source configured to provide a first overshoot duration control current; and a first capacitor coupled to receive the first overshoot duration control current; and a first feedback circuit configured to generate a first oscillation signal when coupled to the first driver circuit, the first oscillation signal having a first frequency that corresponds to the programmable duration of the overshoot current.

8. The preamplifier circuit of claim 7, further comprising:

a first frequency divider circuit coupled to the first feedback circuit, wherein the first frequency divider circuit is configured to divide the first frequency of the first oscillation signal to generate a first divided frequency signal, and wherein the first overshoot duration control current is adjustable to calibrate the programmable duration of the overshoot current based on a measurement of the first divided frequency signal.

9. The preamplifier circuit of claim 8, further comprising a first inverter coupled between the first feedback circuit and the first frequency divider circuit.

10. The preamplifier circuit of claim 8, wherein a first output of the first frequency divider circuit is configured to be coupled to a frequency measurement circuit.

11. The preamplifier circuit of claim 7, wherein the first feedback circuit comprises a feedback path that incorporates the first capacitor into a ring oscillator configuration.

12. The preamplifier circuit of claim 7, wherein the first feedback circuit comprises:

a first AND gate;

a second AND gate; and a plurality of inverters coupled between the first AND gate and the second AND gate.

13. The preamplifier circuit of claim 7, wherein the writer circuit further comprises:

a second driver circuit coupled to a second transistor of the H-bridge, the second driver circuit being configured to generate the overshoot current with the programmable duration, the second driver circuit comprising:

a second current source configured to provide a second overshoot duration control current; and a second capacitor coupled to receive the second overshoot duration control current; and a second feedback circuit configured to generate a second oscillation signal when coupled to the second driver circuit, the second oscillation signal having a second frequency that corresponds to the programmable duration of the overshoot current.

14. A preamplifier circuit of a hard disk drive, the preamplifier circuit comprising:

a writer circuit configured to generate a two-level current signal for driving a magnetic head of the hard disk drive, the two-level current signal comprising a steady-state current and an overshoot current, wherein the writer circuit comprises:

an H-bridge;

a driver circuit coupled to a transistor of the H-bridge and configured to generate the overshoot current with a programmable duration, the driver circuit comprising a current source and a capacitor coupled to the current source, the capacitor being configured to control the programmable duration of the overshoot current;

a feedback circuit; and a switch configured to selectively couple the feedback circuit to the driver circuit such that, in a calibration mode, the feedback circuit and the driver circuit form a ring oscillator that incorporates the capacitor and generates an oscillation signal having a frequency that corresponds to the programmable duration of the overshoot current.

15. The preamplifier circuit of claim 14, wherein the switch is configured to decouple the feedback circuit from the driver circuit in a write mode in which the driver circuit drives the transistor of the H-bridge to generate the two-level current signal.

16. The preamplifier circuit of claim 14, wherein the driver circuit further comprises a discharge transistor coupled to a terminal of the capacitor and configured to discharge the capacitor in response to a data signal.

17. The preamplifier circuit of claim 14, wherein the driver circuit further comprises:

a node configured to receive a data signal;

a plurality of inverters; and a logic gate coupled between a first subset of the plurality of inverters and a second subset of the plurality of inverters, wherein the node is coupled to the transistor of the H-bridge through the plurality of inverters and the logic gate.

18. The preamplifier circuit of claim 17, wherein the logic gate is a NOR gate.

19. The preamplifier circuit of claim 14, further comprising a frequency divider circuit coupled to the feedback circuit and configured to divide the frequency of the oscillation signal to generate a divided frequency signal, wherein the divided frequency signal is configured to be provided to a frequency measurement circuit.

20. The preamplifier circuit of claim 14, wherein the current source is configured to provide a control current to the capacitor, and the programmable duration of the overshoot current is inversely proportional to the control current.

* * * * *